US010349743B2

(12) United States Patent
Shih

(10) Patent No.: US 10,349,743 B2
(45) Date of Patent: Jul. 16, 2019

(54) ELECTRIC DRIVE MECHANISM FOR RECLINER CHAIR

(71) Applicant: Chuan-Hang Shih, Lu-Kang Town, Changhua County (TW)

(72) Inventor: Chuan-Hang Shih, Lu-Kang Town, Changhua County (TW)

(*) Notice: Subject to any disclaimer, the term of this patent is extended or adjusted under 35 U.S.C. 154(b) by 13 days.

(21) Appl. No.: 15/703,269

(22) Filed: Sep. 13, 2017

(65) Prior Publication Data

US 2019/0029426 A1  Jan. 31, 2019

(30) Foreign Application Priority Data

Jul. 31, 2017 (TW) .............................. 106211225 U

(51) Int. Cl.
*B60N 2/23* (2006.01)
*A47C 1/024* (2006.01)
*A47C 1/14* (2006.01)

(52) U.S. Cl.
CPC ............ *A47C 1/0242* (2013.01); *A47C 1/146* (2013.01); *A47C 1/0244* (2013.01); *B60N 2/23* (2013.01); *B60N 2/231* (2013.01)

(58) Field of Classification Search
CPC ...... A47C 1/0242; A47C 1/0244; B60N 2/23; B60N 2/231
USPC ................ 297/362.11, 377, 362.12–362.14; 5/607–619
See application file for complete search history.

(56) References Cited

U.S. PATENT DOCUMENTS

| | | | | |
|---|---|---|---|---|
| 1,075,291 A | * | 10/1913 | Kertesz ............... | A47C 19/005 5/201 |
| 2,788,529 A | * | 4/1957 | Moritzacky ........... | A61G 7/015 5/614 |
| 3,132,897 A | * | 5/1964 | Linden ................. | A47C 1/0246 297/322 |
| 3,339,974 A | * | 9/1967 | Park ..................... | A47C 1/0242 297/362.11 |
| 3,424,492 A | * | 1/1969 | Tabor .................... | B60N 2/23 297/362.14 |
| RE30,954 E | * | 6/1982 | Smith .................... | A61G 5/006 297/118 |
| 4,685,160 A | * | 8/1987 | Rizzardo ............... | A47C 19/005 5/201 |
| 4,877,291 A | * | 10/1989 | Taylor .................. | A47C 1/03255 297/300.3 |
| 4,970,737 A | * | 11/1990 | Sagel ..................... | A47C 20/08 5/201 |
| 4,989,281 A | * | 2/1991 | Christensen ........ | B62D 33/0612 296/190.02 |

(Continued)

*Primary Examiner* — Syed A Islam
(74) *Attorney, Agent, or Firm* — Muncy, Geissler, Olds & Lowe, P.C.

(57) ABSTRACT

An electric drive mechanism for a recliner chair having a base mount and a moveable frame pivotally connected with the base mount includes a fixation frame detachably mounted to the base mount, a push frame pivotally connected with the fixation frame and located below the moveable frame, and an actuator pivotally connected with the fixation frame and the push frame, such that the push frame is driven by the actuator to swing relative to the fixation frame. When the push frame swings upwardly, a front end portion of the push frame pushes the moveable frame to swing upwardly. A user lying on the recliner chair can easily control the swing angle of movable frame so as to lie on the recliner chair with a relaxed posture.

11 Claims, 8 Drawing Sheets

(56) References Cited

U.S. PATENT DOCUMENTS

| | | | | |
|---|---|---|---|---|
| 5,102,193 | A * | 4/1992 | Goss | A47C 1/143 297/362.13 |
| 5,579,550 | A * | 12/1996 | Bathrick | A47C 19/005 5/184 |
| 5,715,548 | A * | 2/1998 | Weismiller | A61G 7/00 5/611 |
| 5,829,077 | A * | 11/1998 | Neige | A47C 20/041 5/618 |
| 5,868,461 | A * | 2/1999 | Brotherston | A47C 1/0342 297/325 |
| 5,927,812 | A * | 7/1999 | Vanderminden, Sr. | A47C 1/024 297/325 |
| 6,079,065 | A * | 6/2000 | Luff | A47C 20/041 5/613 |
| 6,158,808 | A * | 12/2000 | Margolis | A47C 1/035 297/284.5 |
| 6,209,463 | B1 * | 4/2001 | Koharchik | A61G 13/0018 108/7 |
| 6,247,753 | B1 * | 6/2001 | Alvestad | A47C 20/08 297/317 |
| 6,439,636 | B1 * | 8/2002 | Kuo | B60N 2/0232 296/65.01 |
| 6,505,363 | B2 * | 1/2003 | Davis | A47C 17/80 296/190.02 |
| 6,568,008 | B2 * | 5/2003 | Siepmann | A61G 13/0018 5/617 |
| 7,069,608 | B2 * | 7/2006 | Failor | A61G 5/006 280/650 |
| 7,146,662 | B1 * | 12/2006 | Pollard | A47B 91/16 5/617 |
| 7,237,289 | B2 * | 7/2007 | Loewenthal | A47C 19/04 108/158.12 |
| 7,708,346 | B2 * | 5/2010 | White | A47C 1/0244 297/362.12 |
| 7,900,302 | B2 * | 3/2011 | Long | A47C 20/08 5/617 |
| 8,065,764 | B2 * | 11/2011 | Kramer | G06F 19/00 5/624 |
| 8,091,165 | B2 * | 1/2012 | Mossbeck | A47C 20/041 5/200.1 |
| 8,468,626 | B2 * | 6/2013 | Carrier | B60P 3/38 5/607 |
| 8,935,817 | B2 * | 1/2015 | Suh | A47C 19/122 5/174 |
| 9,009,896 | B2 * | 4/2015 | Suh | A47C 19/122 5/618 |
| 9,668,587 | B1 * | 6/2017 | Huang | A47C 19/025 |
| 2005/0172405 | A1 * | 8/2005 | Menkedick | A61B 5/1115 5/618 |
| 2009/0134682 | A1 * | 5/2009 | Andou | B60N 2/236 297/362.12 |
| 2011/0049957 | A1 * | 3/2011 | Luwisch | A47C 1/0244 297/377 |
| 2014/0250600 | A1 * | 9/2014 | McCarty | A61G 7/015 5/617 |
| 2015/0054315 | A1 * | 2/2015 | Donovan | A47C 1/0242 297/68 |
| 2016/0022518 | A1 * | 1/2016 | Shih | A61G 7/018 5/616 |
| 2016/0120717 | A1 * | 5/2016 | Wurdeman | A61G 7/015 5/611 |
| 2017/0071344 | A1 * | 3/2017 | Marcantoni | A47C 1/029 |
| 2017/0347806 | A1 * | 12/2017 | Shih | A47C 20/041 |

* cited by examiner

_US 10,349,743 B2_

ELECTRIC DRIVE MECHANISM FOR RECLINER CHAIR

BACKGROUND OF THE INVENTION

1. Field of the Invention

The present invention relates generally to an electric drive mechanism and more particularly, to a motorized reclining mechanism adapted for being used in a recliner chair.

2. Description of the Related Art

In general, people lying on a recliner chair feels more relaxed than seating on a traditional chair. The recliner chair is usually composed of a seat and a backrest that is titled at a predetermined angle relative to the seat. When an occupant lies on the recliner, he/she may feel comfortable and relaxed because the upper body and the lower body of the occupant are fully supported at a desired angle therebetween. As such, the recliner chairs are widely used as rest chairs in hospitals and outdoors or serve as camp chairs, beach chairs, etc.

However, the inclination angle of the above-mentioned conventional recliner chair is usually fixed, resulting in that the user cannot determine the inclining degree of the backrest to fulfill his/her need. There are commercially available recliner chairs capable of adjusting the inclination angle of the backrest, but the angle adjustment is usually operated by the user manually. That is, the user needs to get up and walk to a place behind the backrest to adjust the inclination angle of the backrest when the user lying on the recliner chair wants to change the inclination angle. This operation is quite troublesome, deteriorating relaxing effect of the recliner chair.

SUMMARY OF THE INVENTION

The present invention has been accomplished in view of the above-noted circumstances. It is an objective of the present invention to provide an electric drive mechanism, which is compatible with various commercially available recliner chairs having different widths and enables the user, who lies on a recliner chair that is equipped with the electric drive mechanism, to select a desired lying angle with an easy operation.

To attain the above objective, the present invention provides an electric drive mechanism for a recliner chair having a base mount and a moveable frame pivotally connected with the base mount, comprising a fixation frame detachably mounted to the base mount, a push frame, and an actuator. The push frame is located below the moveable frame and has a front end portion, and a rear end portion pivotally connected with the fixation frame. The actuator has two ends pivotally connected with the fixation frame and the push frame respectively, such that the push frame is driven by the actuator to swing relative to the fixation frame. When the push frame is driven to swing upwardly, the front end portion of the push frame pushes the moveable frame, such that the moveable frame swings upwardly.

As a result, when a user lies on the recliner chair equipped with the electric drive mechanism of the present invention, the user can easily control the upward swinging angle of the moveable frame relative to the base mount to a desired angle that the user feels most comfortable and relaxed. Further, with the feature that the fixation frame is detachably mounted to the base mount, the electric drive mechanism of the present invention can be installed in various recliner chairs with different types and widths. Therefore, the user needs not to buy a plurality of electric drive mechanisms to incorporate with existing recliner chairs one by one, thereby saving cost.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
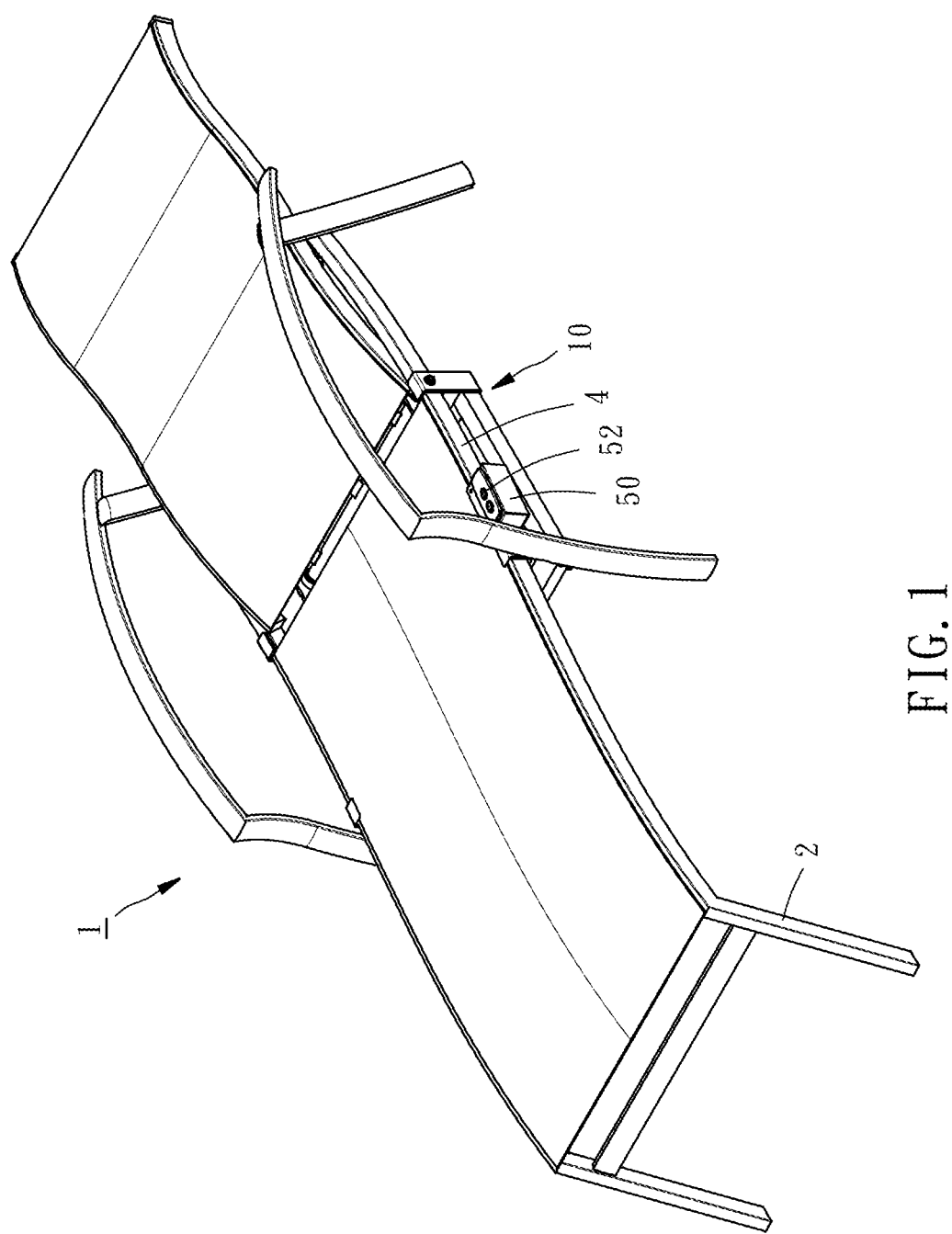
FIG. 1 is a perspective top view of a recliner chair equipped with an electric drive mechanism according to a preferred embodiment of the present invention.
Figure 2:
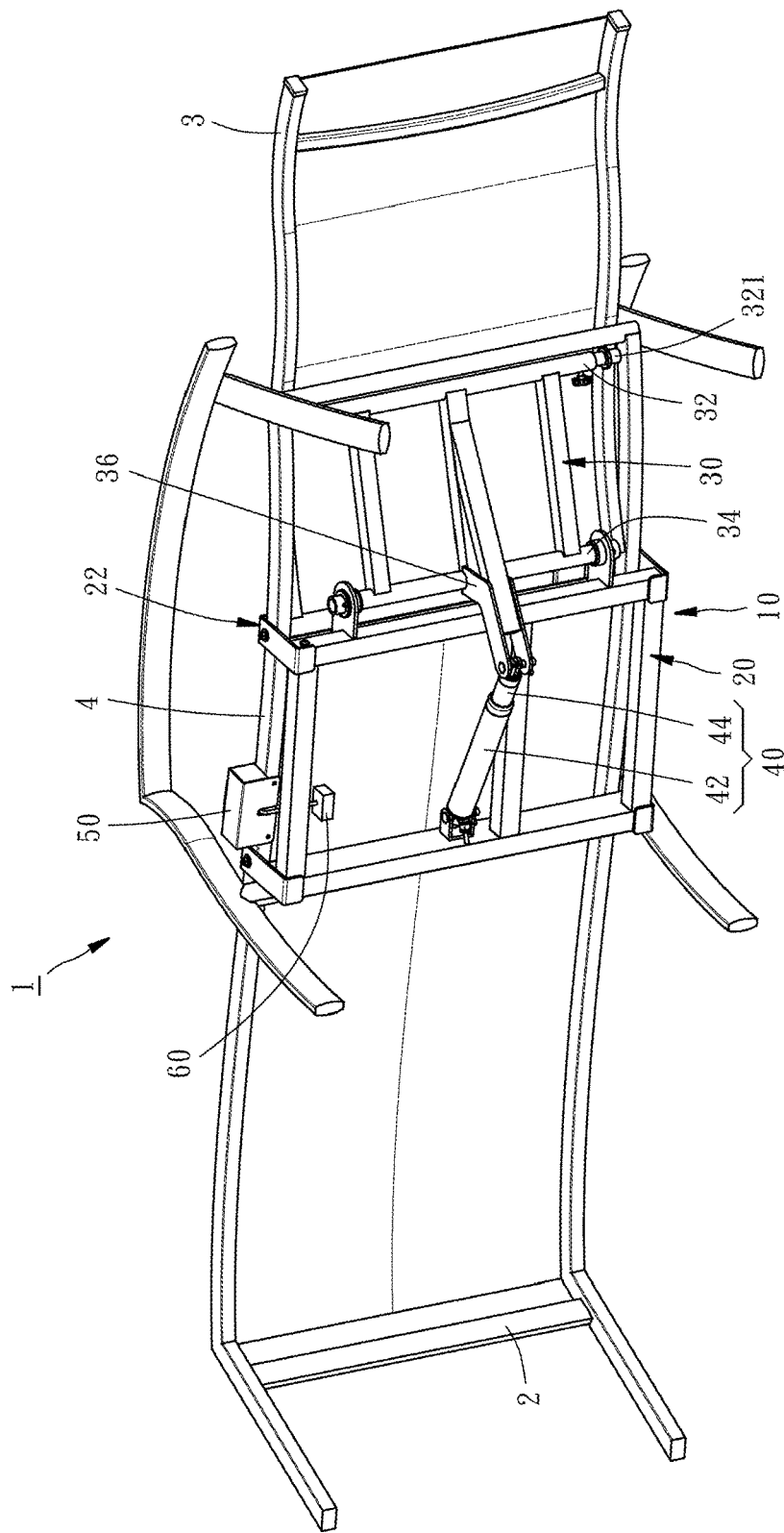
FIG. 2 is a perspective bottom view of the recliner chair equipped with the electric drive mechanism according to the preferred embodiment of the present invention.

FIGS. 1 and 2 show an electric drive mechanism 10 used in a recliner chair 1 in accordance with a preferred embodiment of the present invention. The recliner chair 1 is composed of a base mount 2 and a moveable frame 3, i.e. a backrest frame, which is pivotally connected with the base mount 2. The base mount 2 includes two lateral rods 4. The electric drive mechanism 10 is composed of a fixation frame 20, a push frame 30, an actuator 40, a controller 50, and a battery 60. In this embodiment, the left side of FIG. 2 is defined as a rear side of the recliner chair 1, and the right side of FIG. 2 is a front side of the recliner chair 1.

Figure 3:
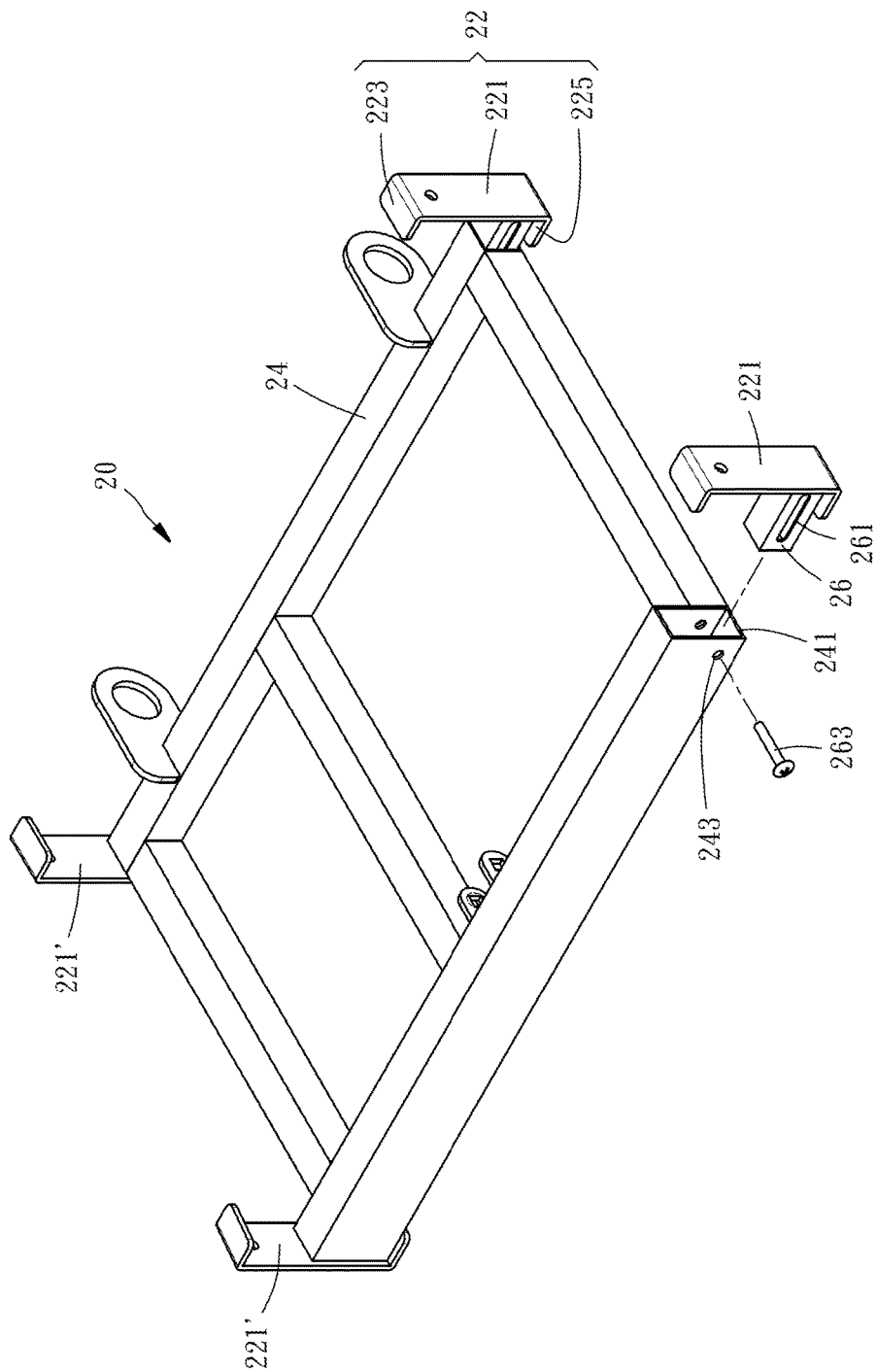
FIG. 3 is a perspective view showing a fixation frame and fasteners of the electric drive mechanism according to the preferred embodiment of the present invention.

Referring to FIG. 3, the fixation frame 20 includes a frame body 24 and two retractable and extendable portions 26. The frame body 24 has two tube portions 241 parallel to each other. Each retractable and extendable portion 26 is shaped like a tube, which is extendable from and retractable into an end of one of the two tube portions 241. Each tube portion 241 is provided with two through holes, through which a bolt 263 is inserted and screwingly threaded with a nut (not shown) provided at a side of one of the two through holes 243, such that the bolt 263 can be fixedly mounted to the tube portion 241. Each retractable and extendable portion 26 is provided with an elongated slot 261 corresponding in location to the two through holes 243 of one tube portion 241 and located between the two through holes 243. The bolt 263 passes through the elongated slot 261. When the retractable and extendable portion 26 extends from or retracts back into the tube portion 241, the elongated slot 261 moves relative to the bolt 263. As an inner end is stopped against the bolt 263, it means the retractable and extendable portion 26 is extended to its maximum extent, and cannot be extended anymore. Because the retractable and extendable portion 26 is limited by the bolt 26, the retractable and extendable portion 26 will not escape from the tube portion 241 when the retractable and extendable portion 26 extends or retracts. In this embodiment, the retractable and extendable portion 26 is inserted into the tube portion 241 for retraction and extension. In another feasible embodiment, the retractable and extendable portion 26 may be sleeved onto the tube portion 241 for retraction and extension. Further, the tube portion 241 may be provided with two protruding blocks extending into the elongated slot 261. Under this circumstance, the bolt 263 may be omitted.

The fixation frame 20 is detachably mounted to the base mount 2. In this embodiment, the fixation 20 is mounted to the base mount 2 via four fasteners 22. Two of the four fasteners 22 each have an upright portion 221, an upper transverse portion 223 extending from a top end of the upright portion 221, and a lower transverse portion 225 extending from a bottom end of the upright portion 221. The other two fasteners 22 each have an upright portion 221', an upper transverse portion 223 extending from a top end of the upright portion 221', and a lower transverse portion 225 extending from a bottom end of the upright portion 221'. The two upright portions 221 are substantially arranged in a parallel manner, detachably mounted to one of the lateral rods 4 of the base mount 2 via at least one screw, and connected with the two retractable and extendable portions 26 of the fixation frame 20, respectively. The other two upright portions 221' are detachably mounted to the other one of the lateral rods 4 of the base mount 2 via at least one screw and connected with the fixation frame 20, respectively. The upper transverse portions 223 are crossly disposed on a top surface of a respective lateral rod 4 for enhancing stability of the fixation frame 20. The lower transverse portions 225 are disposed thereon with the fixation frame 20. When the two retractable and extendable portions 26 extend from the tube portions 241 outwardly, the two upright portions 221 move in a direction away from the fixation frame 20 and the two upright portions 221' stay stationary relative to the fixation frame 20.

Figure 4:
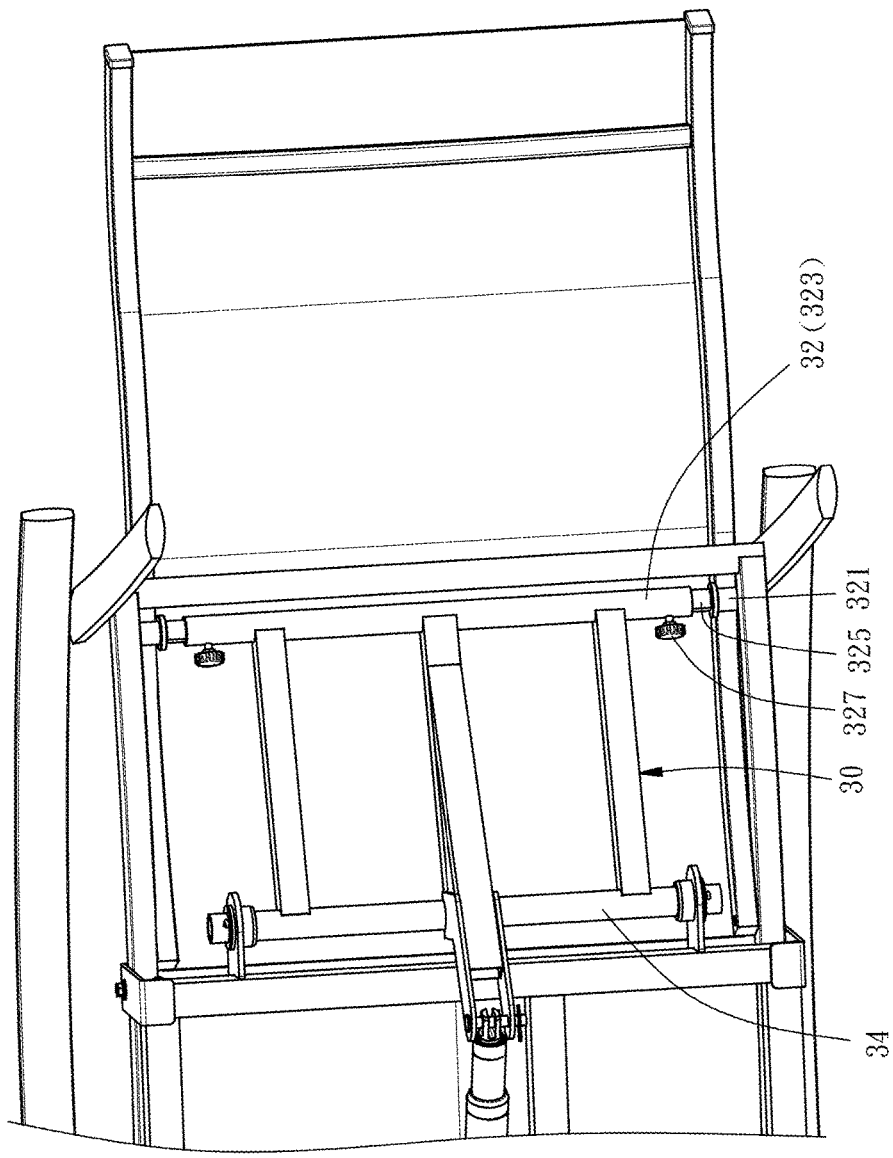
FIG. 4 is an enlarged view of a part of the electric drive mechanism according to the preferred embodiment of the present invention.

The push frame 30 includes a front end portion 32, a rear end portion 34 pivotally connected with the fixation frame 20, and a downwardly extending portion 36 extending from the rear end portion 34. The push frame 30 is located below the moveable frame 3. The front end portion 32 is provided with two rollers 321 contacted with a bottom surface of the moveable frame 3. Referring to FIG. 4, in this embodiment, the front end portion 32 of the push frame 30 includes a tube body 323, and two retractable and extendable members 325 that are retractable into and extendable from two ends of the tube body 323, respectively. The two rollers 321 are rotatably disposed to the retractable and extendable members 325, respectively. When the retractable and extendable members 325 extend from the tube body 323 outwardly, the rollers 321 move away from the tube body 323. When the retractable and extendable members 325 retract back into the tube body 323, the rollers 321 move toward the tube body 323. As such, the distance between the two rollers 321 is adjustable by means of the two retractable and extendable members 325. When the distance between the two rollers 321 is adjusted to a desired length, each retractable and extendable member 325 can be stationarily fixed with respect to the tube body 323 by using a locking member 327 that is screwingly threaded through the tube body 323 and tightly abutted against the respective retractable and extendable member 325. In this embodiment, the retractable and extendable members 325 are inserted into the tube body 323 for retraction and extension. However, in another feasible embodiment, the retractable and extendable members 325 may be sleeved onto the tube body 323 for retraction and extension.

The actuator 40 has two ends pivotally connected with the fixation frame 20 and the push frame 30, respectively. In this way, the push frame 30 is drivenable by the actuator 40 to swing relative to the fixation frame 20. In this embodiment, the actuator includes a cylindrical body 42 and a retractable and extendable rod 44 forwardly extending from the cylindrical body 42. A rear end of the cylindrical body 42 is pivotally connected with the fixation frame 20, and a front end of the retractable and extendable rod 44 is pivotally connected with the downwardly extending portion 36 of the push frame 30. In another feasible embodiment, the actuator 40 is arranged in a reverse orientation. Under this circumstance, the retractable and extendable rod 44 backwardly extends from the cylindrical body 42, and the outer end of the retractable and extendable rod 44 is pivotally connected with the fixation frame 20 and the cylindrical body 42 is connected with the push frame 30. In still another embodiment, the push frame 30 has no such downwardly extending portion 36, and the actuator 40 is pivotally connected with the other part of the push frame 30.

The controller 50 is disposed to the base mount 2 for controlling retraction and extension of the retractable and extendable rod 44 of the actuator 40. In this embodiment, the controller 50 includes to two pushbuttons 52 for lifting and lowering the moveable frame 3, respectively. In another feasible embodiment, the controller 50 may include a rocker switch in lieu of the pushbuttons 52. The controller 50 can be installed at any place of the recliner chair 1. Further, the controller 50 may be realized as a handheld remote controller electrically connected with the actuator 40.

The battery 60 is disposed on the fixation frame 20 and supplies electric power to the controller 50 and the actuator 40. In another feasible embodiment, the battery 60 is omitted, and an external power source is used to supply electric power to the controller 50 and the actuator 40.

Figure 5:
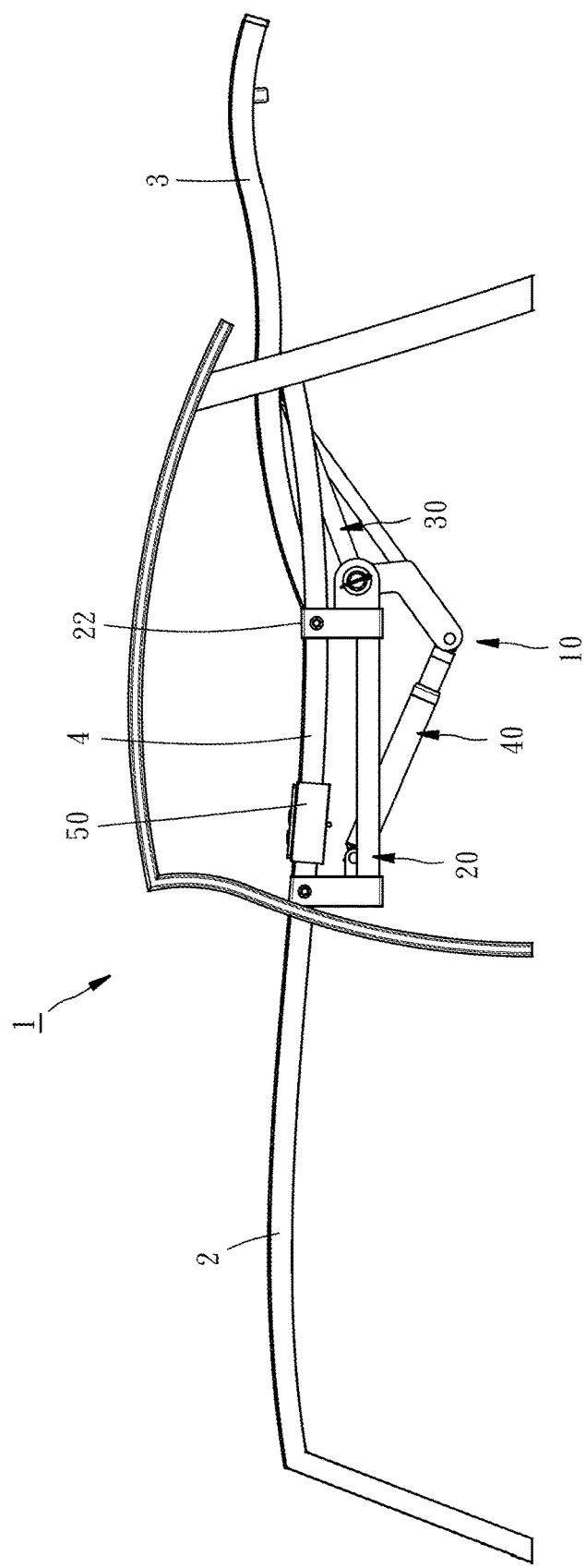
FIG. 5 is a lateral elevational view of the recliner chair equipped with the electric drive mechanism according to the preferred embodiment of the present invention.
Figure 6:
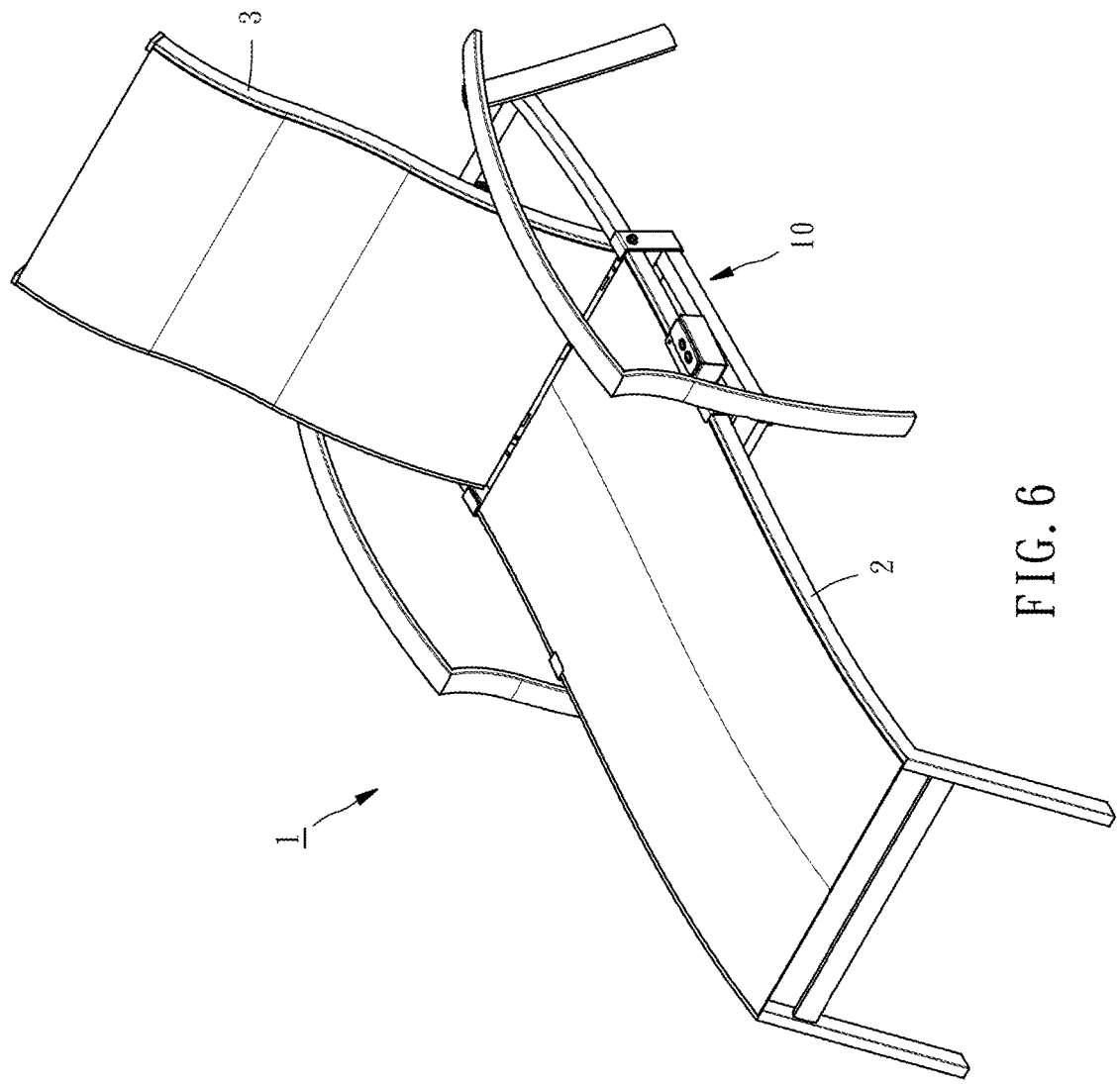
FIG. 6 is another perspective top view of the recliner chair equipped with the electric drive mechanism according to the preferred embodiment of the present invention, showing the electric drive mechanism is in a state of operation.
Figure 7:
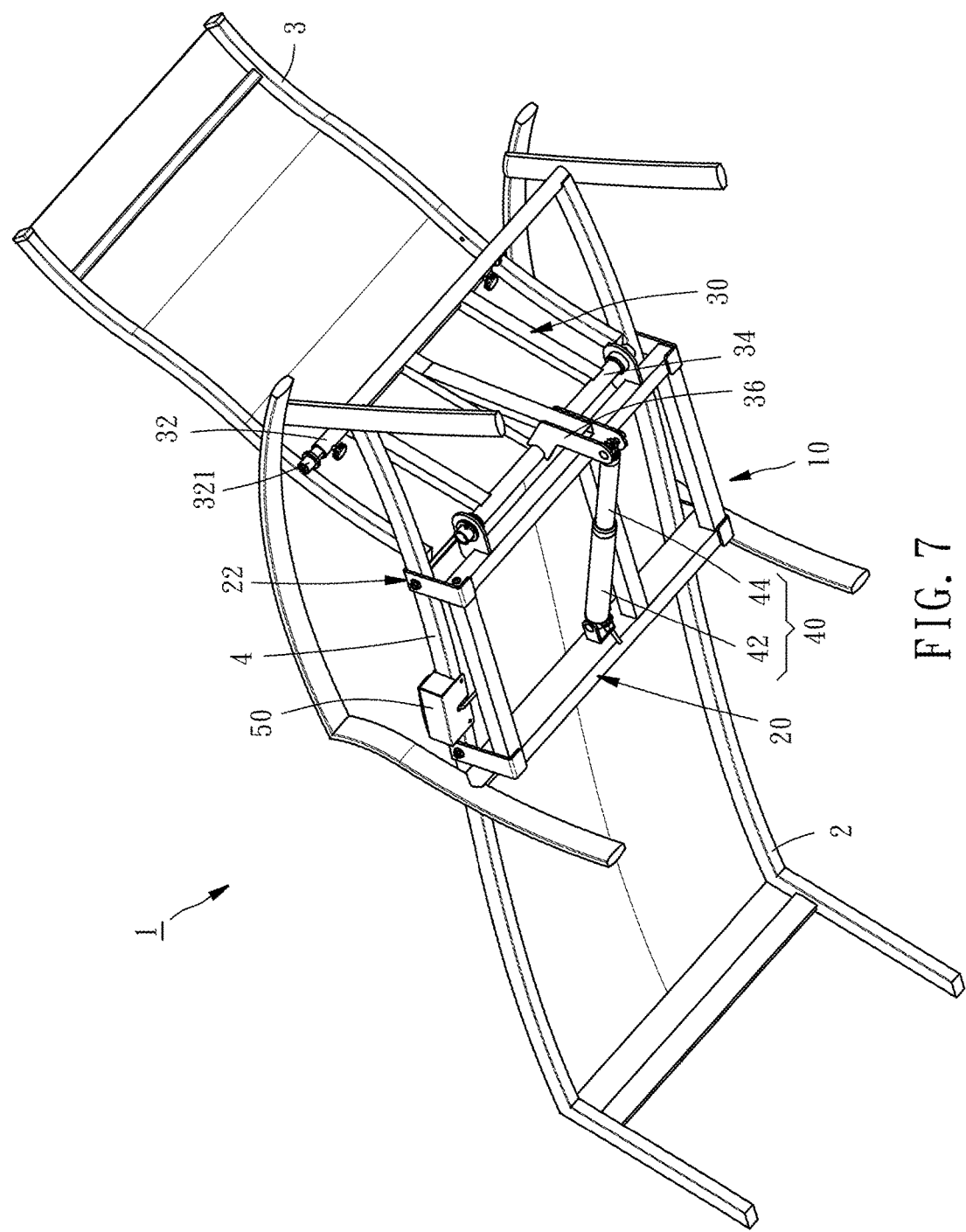
FIG. 7 is another perspective bottom view of the recliner chair equipped with the electric drive mechanism according to the preferred embodiment of the present invention, showing the electric drive mechanism is in a state of operation.
Figure 8:
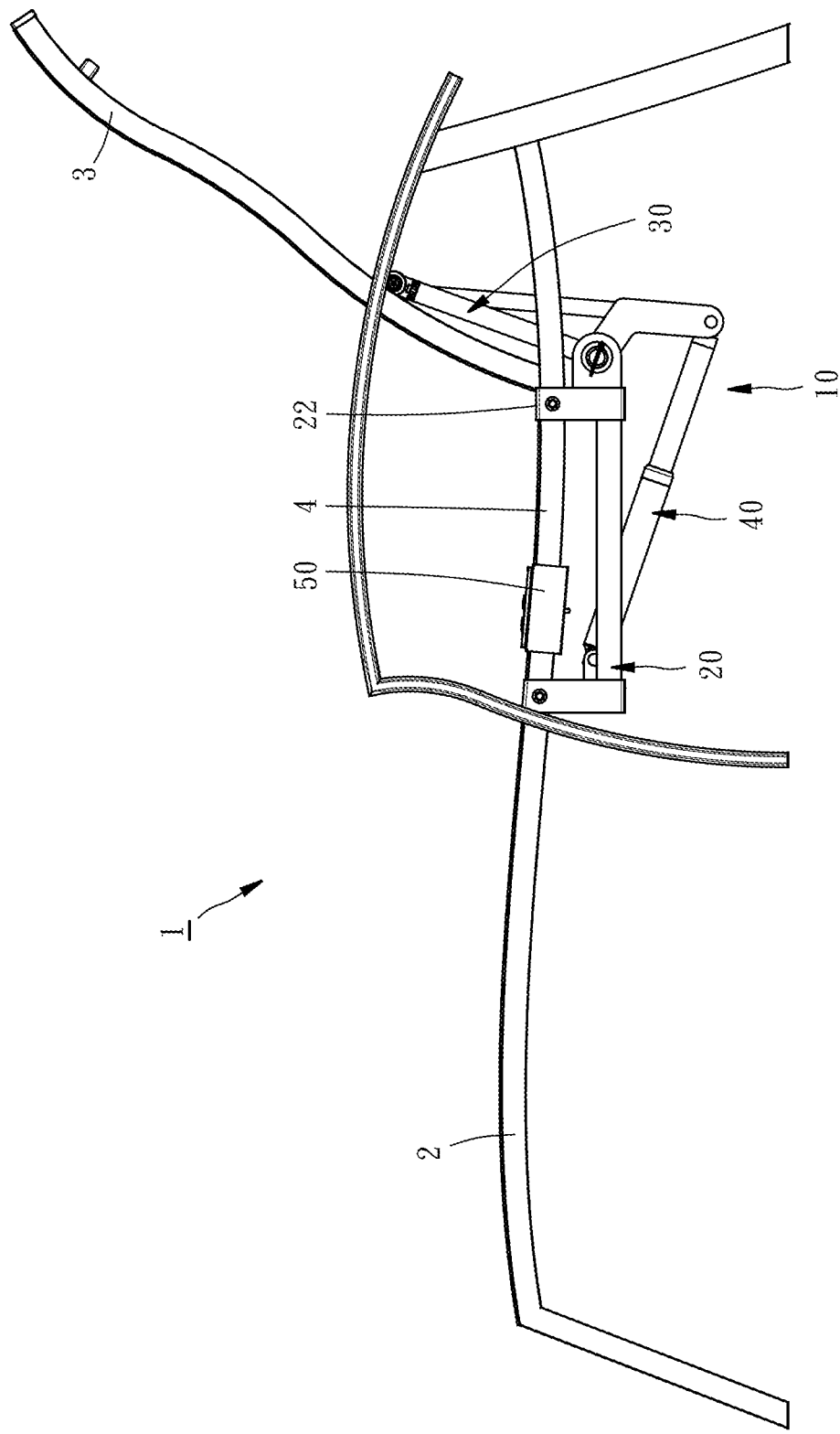
FIG. 8 is another lateral elevational view of the recliner chair equipped with the electric drive mechanism according to the preferred embodiment of the present invention, showing the electric drive mechanism is in a state of operation.

As shown in FIG. 5, when the actuator 40 is not extended, i.e. the retractable and extendable rod 44 has not forwardly extended from the cylindrical body 42, the recliner chair 1 stays substantially at a flat, initial stage. At this initial stage, the two rollers 321 of the front end portion 32 of the push frame 30 may or may not contact the moveable frame 3. When a user lies on the recliner chair 1 and wants to change his/her lying posture to a sitting posture, the user can easily touch one of the pushbuttons 52 of the controller 50 to enable the retractable and extendable rod 44 to forwardly extend from the cylindrical body 42. As a result, as shown in FIGS. 6 to 8, the push frame 30 is driven by the actuator 40 to swing upwardly, and the two rollers 321 of the front end portion 32 of the push frame 30, which contact the moveable frame 3, roll on the bottom surface of the moveable frame 3 to push the moveable frame 3 to upwardly swing relative to the base mount 2. Similarly, when a user sitting on the recliner chair 1 would like to change his/her sitting posture to a lying posture, the user can easily touch the other pushbutton 52 to enable the retractable and extendable rod 44 to retract back into the cylindrical body 42, such that the push frame 30 is pulled by the actuator 40 to swing downwardly, resulting in that the moveable frame 3 swings downwardly relative to the base mount 2. In this way, a user lying on the recliner chair 1 equipped with the electric drive mechanism 10 can easily control the upward swinging angle of the moveable frame 3 relative to the base mount 2 to a desired angle that the user feels most comfortable and relaxed.

In another aspect, when a user would like to dismantle the electric drive mechanism 10 from the recliner chair 1 and to install the same to another recliner chair, the electric drive mechanism 10 can be easily dismantled by loosening the screws engaged with the fasteners 22 and then pulling the fasteners 22 away from the recliner chair 1. Similarly, the electric drive mechanism 10 can be conveniently installed to the recliner chair 1 by pulling the fasteners 22 outwardly, engaging the fasteners 22 with the lateral rods 4 by hooking the upper transverse portions 223 on the lateral rods 4 of the base mount 2, and then tightening up screws engaged with the upright portions 221 and 221'. The retractable and extendable portions 26 and the retractable and extendable members 325 can be adjusted to meet a specific width of a recliner chair that is to be equipped with the electric drive mechanism 10 of the present invention. Therefore, the electric drive mechanism 10 can be installed to various recliner chairs having different types and widths. As such, the user needs not to buy a plurality of electric drive mechanisms to incorporate with existing recliner chairs one by one, thereby saving cost. In particular, when the two retractable and extendable portions 26 extend to desired, ideal positions, tightening up the two bolts 263 to compress the two retractable and extendable portions 26 will make the structure of the fixation frame 20 more stable with less possibility of vibration.

According to the technical features of the present invention, modifications to the structure of the electric drive mechanism 10 may be available. For example, the way of detachably mounting the electric drive mechanism 10 to the recliner chair 1 can be modified, or the structure of the fastener 22 can be modified in accordance with actual need. For instance, the fastener 22 may be provided with no such lower transverse portion 225. However, no matter what way of mounting the electric drive mechanism 10 to the recliner chair or modification of the structure of the fastener 22 is, the electric drive mechanism 10 of the present invention is configured to be detachably or fixedly mounted to the recliner chair 1. Further, the roller 321 may be omitted, such that the front end portion 32 of the push frame 30 directly contacts the moveable frame 3. Furthermore, the retractable and extendable portions 26 and the retractable and extendable members 325 can be also omitted. Under this circumstance, the width of the fixation frame 20 and the width of the tube body 323 of the front end portion 32 of the push frame 30 are fixed, not adjustable, and the upright portions 221 of the fasteners 22 are connected with the frame body 24, and the rollers 321 are provided at the front end portion 32 of the push frame 30. Moreover, the numbers of the retractable and extendable portions 26, fasteners 22 and the rollers 321 may vary in accordance with actual need, and the number of the tube portions 241 may be determined in correspondence with the aforesaid numbers of the retractable and extendable portions 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric drive mechanism for a recliner chair having a base mount and a moveable frame pivotally connected with the base mount, the electric drive mechanism comprising:
   a fixation frame detachably mounted to the base mount;
   a push frame located below the moveable frame, the push frame having a front end portion, and a rear end portion pivotally connected with the fixation frame; and
   an actuator having two ends pivotally connected with the fixation frame and the push frame respectively, such that the push frame is driven by the actuator to swing relative to the fixation frame;
   wherein when the push frame is driven to swing upwardly, the front end portion of the push frame pushes the moveable frame, such that the moveable frame swings upwardly.

2. The electric drive mechanism as claimed in claim 1, wherein the base mount comprises two lateral rods, and the fixation frame is detachably mounted to the base mount by a plurality of fasteners: each of the fasteners comprises an upright portion mounted with the fixation frame and one of the lateral rods, and an upper transverse portion extending from a top end of the upright portion and crossly disposed on a top surface of the one of the lateral rods.

3. The electric drive mechanism as claimed in claim 2, wherein each of the fasteners further comprises a lower transverse portion extending from a bottom end of the upright portion; the fixation frame is disposed on the lower transverse portions of the fasteners.

4. The electric drive mechanism as claimed in claim 2, wherein the fixation frame comprises a frame body and a retractable and extendable portion that is extendable from and retractable into the frame body; the upright portion of each of the fasteners is disposed to the retractable and extendable portion of the fixation frame.

5. The electric drive mechanism as claimed in claim 4, wherein the frame body of the fixation frame comprises a tube portion; the retractable and extendable portion of the fixation frame has a tube shape and is inserted into the tube portion of the frame body.

6. The electric drive mechanism as claimed in claim 5, wherein the retractable and extendable portion of the fixation frame comprises an elongated slot, through which a bolt that is mounted to tube portion of the frame body of the fixation frame is inserted.

7. The electric drive mechanism as claimed in claim 1, wherein the front end portion of the push frame is provided with at least one roller contacted with a bottom surface of the moveable frame.

8. The electric drive mechanism as claimed in claim 7, wherein the front end portion of the push frame comprises a tube body and at least one retractable and extendable member that is retractable into and extendable from the tube body; the at least one roller is provided at the at least one retractable and extendable member of the front end portion of the push frame.

9. The electric drive mechanism as claimed in claim 1, wherein the push frame comprises a downwardly extending portion pivotally connected with one of the two ends of the actuator.

10. The electric drive mechanism as claimed in claim 1, further comprising a controller disposed on the base mount for controlling retraction and extension of the actuator.

11. The electric drive mechanism as claimed in claim 10, further comprising a battery disposed on the fixation frame for supplying electric power to the controller and the actuator.

* * * * *